United States Patent [19]

Blackburn et al.

[11] 4,111,273
[45] Sep. 5, 1978

[54] TERMINAL TRACTOR

[75] Inventors: Keith Blackburn, Enumclaw; Douglas Ross, Bellevue, both of Wash.

[73] Assignee: Dock Truck, Inc., Bellevue, Wash.

[21] Appl. No.: 729,836

[22] Filed: Oct. 4, 1976

[51] Int. Cl.² ............................................. B62D 15/00
[52] U.S. Cl. .................. 180/14 R; 180/139; 280/423 R; 280/425 R; 280/492; 280/111
[58] Field of Search ................... 180/51, 139, 11, 12, 180/14 R, 22; 280/425 A, 111, 425 R, 423 R, 423 A, 438, 492, 400; 105/368 S; 214/505, 506

[56] References Cited

U.S. PATENT DOCUMENTS

| | | | |
|---|---|---|---|
| 2,835,397 | 5/1958 | Wagner | 180/51 X |
| 3,112,040 | 11/1963 | Levitt et al. | 280/425 R |
| 3,282,367 | 11/1966 | Mathew et al. | 180/51 |
| 3,321,215 | 5/1967 | Kampert | 280/425 R |
| 3,416,624 | 12/1968 | Kolthoff | 180/14 R |
| 3,450,222 | 6/1969 | Ohlson | 180/50 X |
| 3,662,848 | 5/1972 | Magnusson | 180/51 |
| 3,690,395 | 9/1972 | Spiller et al. | 180/51 |
| 3,874,703 | 4/1975 | Ross et al. | 280/425 R |

Primary Examiner—Kenneth H. Betts
Attorney, Agent, or Firm—Seed, Berry, Vernon & Baynham

[57] ABSTRACT

A terminal tractor for maneuvering a trailer having a fifth wheel component in a confined area has front and rear wheeled sections pivotally connected via an intermediate section for steering the tractor by articulation of the front and intermediate sections relative to each other. The articulation pivot in combination with the fifth wheel pivot connection between the tractor and trailer allows the trailer to be parked by backing with relatively little longitudinal movement of the trailer required. The intermediate section is connected to the rear section by an oscillating connection for allowing the rear section to rotate with respect to the front and intermediate sections along a generally longitudinal axis to allow all of the tractor's wheels to maintain road contact while traveling on irregular road surfaces. The fifth wheel plate of the tractor may be selectively raised to lift the forward ground support of the trailer above the road surface to allow rapid repositioning of the trailers.

10 Claims, 11 Drawing Figures

FIG. 8
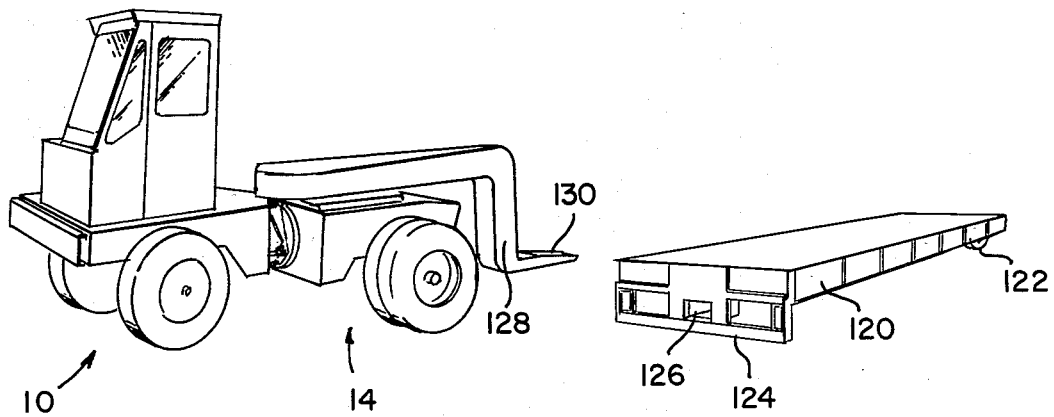
FIG. 9
FIG. 10
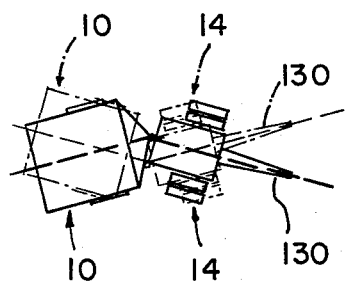
FIG. 11
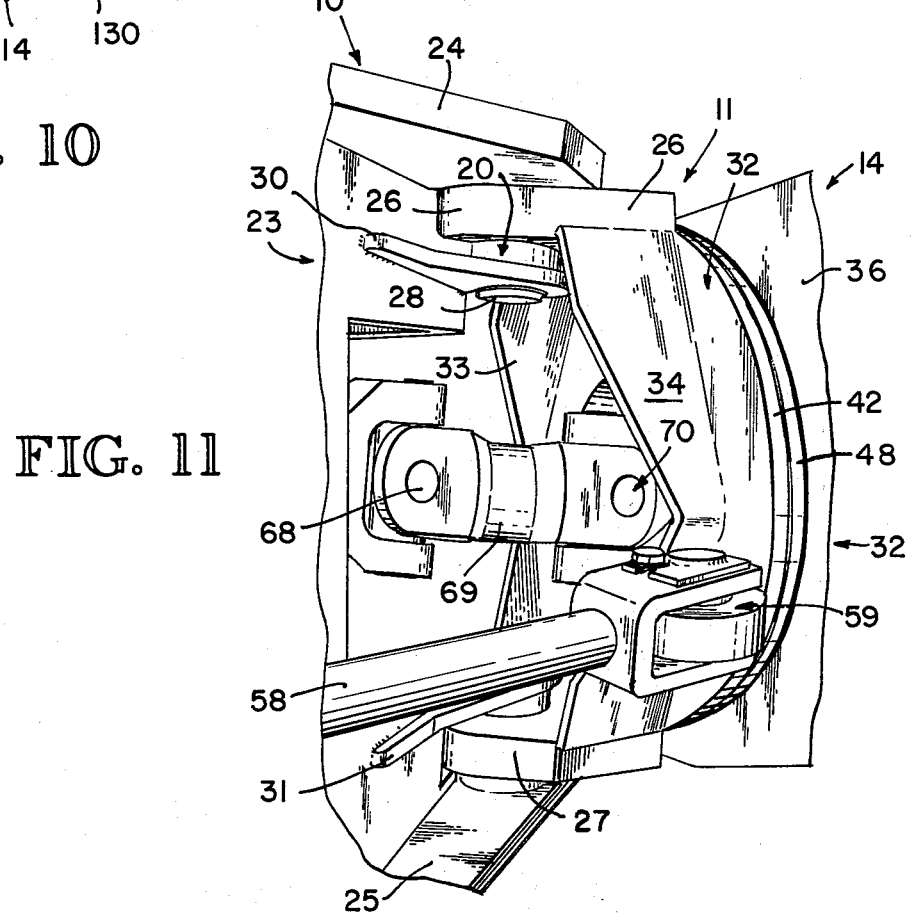

TERMINAL TRACTOR

BACKGROUND OF THE INVENTION

1. Field of the Invention

This invention relates to tractors for use with a fifth wheel trailer and, more particularly, to a terminal tractor which is adapted for maneuvering a trailer in a confined area and on ramps or other irregular road surfaces.

2. Description of the Prior Art

With the development of containerization it has become common to transport containers by water or rail on semi-trailers driven aboard container ships or railway cars. After the destination terminal is reached the semi-trailers are driven off the vessel or railway car, normally to a distribution yard. Generally the trailers are designed for on-highway use with conventional fifth wheel trucks so that they can be loaded and unloaded at sites remote from the terminal. Space is normally at a premium at terminal distribution yards, and hence maneuvering space is limited in the yards as well as on the container ships. Various vehicles have been used to move the trailers in such confined quarters including fork lift trucks, straddle carriers and terminal tractors. In the past terminal tractors have basically been shortened versions of conventional fifth-wheel trucks and have had their fifth wheel provided with a hydraulic lift controllable by the operator from the truck cab so that the landing gear (front stand) of the semi-trailers does not have to be cranked up each time that the trailers are moved in the terminal and loaded or unloaded on and off the ships or railway cars.

It is difficult to park a semi-trailer against a wall or other trailer by use of a conventional terminal tractor, particularly if backing space is quite limited. In some instances such a maneuver cannot be accomplished without uncoupling the tractor, moving it to a more acute angle relative to the tractor, recoupling it, and then backing the tractor to push the front of the trailer laterally. Even if this uncoupling procedure is not necessary, it may be required to jockey the tractor and trailer back and forth several times while slewing the tractor wheels in order to achieve the parking objective. On some occasions the quarters are so confined on both sides of the desired parking slot that it is virtually impossible to maneuver the trailer into the slot with a conventional terminal tractor.

Difficulties are also experienced in confined quarters even with a skilled operator, in backing a terminal tractor into coupling relationship between the fifth wheel plate of the tractor and the king pin of the trailer even though the fifth wheel plate normally has a double-oscillation mount and has a V-shaped opening for guiding the fifth wheel components together.

This maneuvering difficulty encountered when using conventional terminal tractors and trailers is also experienced, often to even a greater degree, when special trailers are used. For example, when using "roll" trailers, as shown in U.S. Pat. No. 3,874,703, a rearwardly projecting gooseneck attachment to the fifth wheel must be maneuvered by operation of the tractor so as to seat in a receptacle presented at the front of the trailer. Precision maneuvering is required to jockey the rearwardly projecting end of the gooseneck into the receptacle, and frequently the operator finds it necessary to jockey the tractor forwardly and rearwardly several times before meeting with success. This is of course time consuming and adds significantly to operational costs.

Because conventional trailer landing gears were not designed for the stresses encountered aboard ship, particularly in rough sea conditions, in some shipping operations rigid auxiliary stands are provided of the type disclosed in U.S. Pat. No. 3,603,544. Such a stand has a fifth wheel plate which can engage the kingpin of the trailer and also has a kingpin which can engage the fifth wheel plate of a terminal tractor. The stand can thus be used to couple a tractor to a trailer and, when released from the tractor, can become the support for the front end of the trailer on a ship's deck. Such stands are a boxlike structure open at the front to receive the rear end portion of the truck frame with the forward portions of the lateral sides of the stand fitting between the frame and the rear wheels of the truck. This arrangement gives little tolerance between the truck frame and the lateral sides of the stand. Furthermore, the fifth wheel plate of the tractor, rather than being a double oscillating unit as is conventional, is required to be single oscillating about the lateral horizontal axis when such stands are to be used. Hence, significantly more perfect alinement between the longitudinal axes of the truck and trailer is required during the coupling operation than would be required if the stands were not in use. As a result, when using a standard terminal tractor, a skilled operator frequently finds it necessary to jockey the tractor forward and backward several times to achieve the alinement necessary for coupling the tractor to the kingpin of the stand, even in those instances where there are not confined quarters at the coupling site of the trailer.

As previously mentioned, the above-described auxiliary stands normally require use of a single oscillating fifth wheel plate. This frequently results in compounding the severe loads on the tractor frame and elevator mounts for the fifth wheel plate occuring when the tractor is pulling a loaded trailer in a turn at the head or foot of a ramp as, for example, encountered on container ships between the decks. Under such conditions the front and rear wheels cannot all gain ramp or deck contact at the same time without twisting of the frame or the elevating mechanism for the fifth wheel. The resulting stresses commonly cause permanent deformation or failure of parts of the tractor. In this regard, the rear axle suspension for conventional terminal tractors is not of much assistance in alleviating frame stresses under the described conditions of ramp travel because the rear axle suspension of a terminal tractor should be stiff so that when the fifth wheel is elevated to raise the trailer sufficiently for adequate ground clearance, it will not be necessary to first overcome a relatively large vertical travel represented by compression of the rear axle suspension system due to the trailer load.

Another difficulty with terminal tractors is maintaining proper weight distribution so that the front wheels are not lifted out of road contact when a heavy torque load is applied to the rear axle from the engine. To maintain a proper weight balance it has been necessary to load the front bumper of conventional terminal tractors with counterweights in the neighborhood of 1200 to 2500 pounds if the tractor was to have a reasonably short wheel base for relatively short radius turning. Even then, the terminal tractors in use have not had as short a turning radius as needed for the tight turns frequently encountered.

Normally when the container semi-trailers are coupled to an on-highway truck for transport to and from a terminal, the landing gear is cranked up for maximum road clearance. When the trailer is to be uncoupled at the terminal storage yard the truck operator should crank down the landing gear to ground level before driving the truck free of the trailer. The lowering of the landing gear is a burdensome manual operation and frequently the operator doesn't fully carry it out. As a consequence, when the truck is driven from beneath the forward end of the trailer the front of the trailer drops until the landing gear engages the ground. If the ground surface is not paved, the lower end of the landing gear will often sink into the ground, particularly under wet conditions, and if the ground surface is black-topped, occasionally the inpact of the dropping landing gear will drive it through the asphalt, particularly on a hot day, thereby further lowering the front of the trailer. When such a trailer is to be later coupled to a terminal tractor, the tractor operator has need for the fifth wheel plate on the tractor to be capable of being lowered well below the normal coupling level of about 48 inches in order to make it possible to engage the kingpin of the trailer when the tractor is backed into coupling position. The problem of filling this need on a compact terminal tractor is compounded by the fact that it is normally preferred to have the fifth wheel plate occupy a position directly above or slightly forward of the rear axle so that the weight of the trailer will not leverage the front axle of the tractor in the upward direction. Hence, there are acute space limitations for the elevating mechanism for the fifth wheel plate and for any mechanism provided to permit the front and rear axles to freely occupy different planes from one another when loaded. The resulting design engineering problems are particularly formidable if the terminal tractor is to also fill the long felt need of being more maneuverable in such a manner as to significantly ease the operations of coupling to trailers of the various types encountered and parking of the trailers in confined quarters.

SUMMARY OF THE INVENTION

In view of the above-discussed problems and needs in the prior terminal tractor art, the present invention aims to provide an improved terminal tractor which is highly maneuverable and capable of altering a semi-trailer's direction with significantly less longitudinal movement of the trailer than is possible with previous terminal tractors.

Another object is to provide such a terminal tractor which has an unusually small turning circle and normally does not require the use of front counterweights.

A further objective is the providing of a compact terminal tractor with an elevatable fifth wheel plate having an unusually low lower limit of travel located above or forward of the rear axle.

The invention also aims to provide an improved oscillating connection arrangement for articulated tractors which does not raise the height of the frame adjacent the rear axle.

Another significant object is to provide a terminal tractor in which the front and rear axles can occupy different planes without racking the frame or requiring a spring suspension system.

The invention also aims to provide such a terminal tractor which is capable of laterally moving the end of a rearwardly extending gooseneck or other coupling adapter to properly position it for tractor to trailer coupling without virtually any longitudinal movement of the tractor being required during such lateral movement.

Still another object is to provide a terminal tractor of relatively simple and economical construction and reliable operation which meets all of the foregoing aims and objectives.

In carrying out the foregoing object there is provided an articulated tractor having a front wheeled section with a forward mounted engine, a short intermediate section pivotally mounted to the front section at a generally vertical articulation axis, and a rear section having an oscillating connection with the intermediate section and having wheels powered by an articulated drive from the engine. The rear section carries an elevatable fifth wheel plate and the related elevating mechanism and is rigidly mounted on the rear axle to function therewith as a walking beam so that the front and rear axle can operate in different planes while the vehicle has its sections alined or its front and intermediate sections articulated for turning the tractor.

It is recognized that articulated tractors are known in the logging tractor art, as for example, as shown in U.S. Pat. No. 3,049,186, but articulated tractors are not believed to have heretofore been known in the terminal tractor art for use with container semi-trailers.

BRIEF DESCRIPTION OF THE FIGURES OF THE DRAWING

FIGS. 8 and 9 are isometric views of the terminal tractor and a roll trailer, respectively, preparatory to inserting a rearwardly extending gooseneck connector carried by the trailer's fifth wheel plate into the receptacle of a roll trailer.

FIG. 10 is a schematic illustrating the manner in which the rear end of the gooseneck connector in FIG. 8 can be moved laterally by articulating the front and rear sections of the tractor.

FIG. 11 is an isometric view of the oscillating connector and a portion of the drive train extending therethrough.

DETAILED DESCRIPTION OF THE INVENTION

Figure 1:
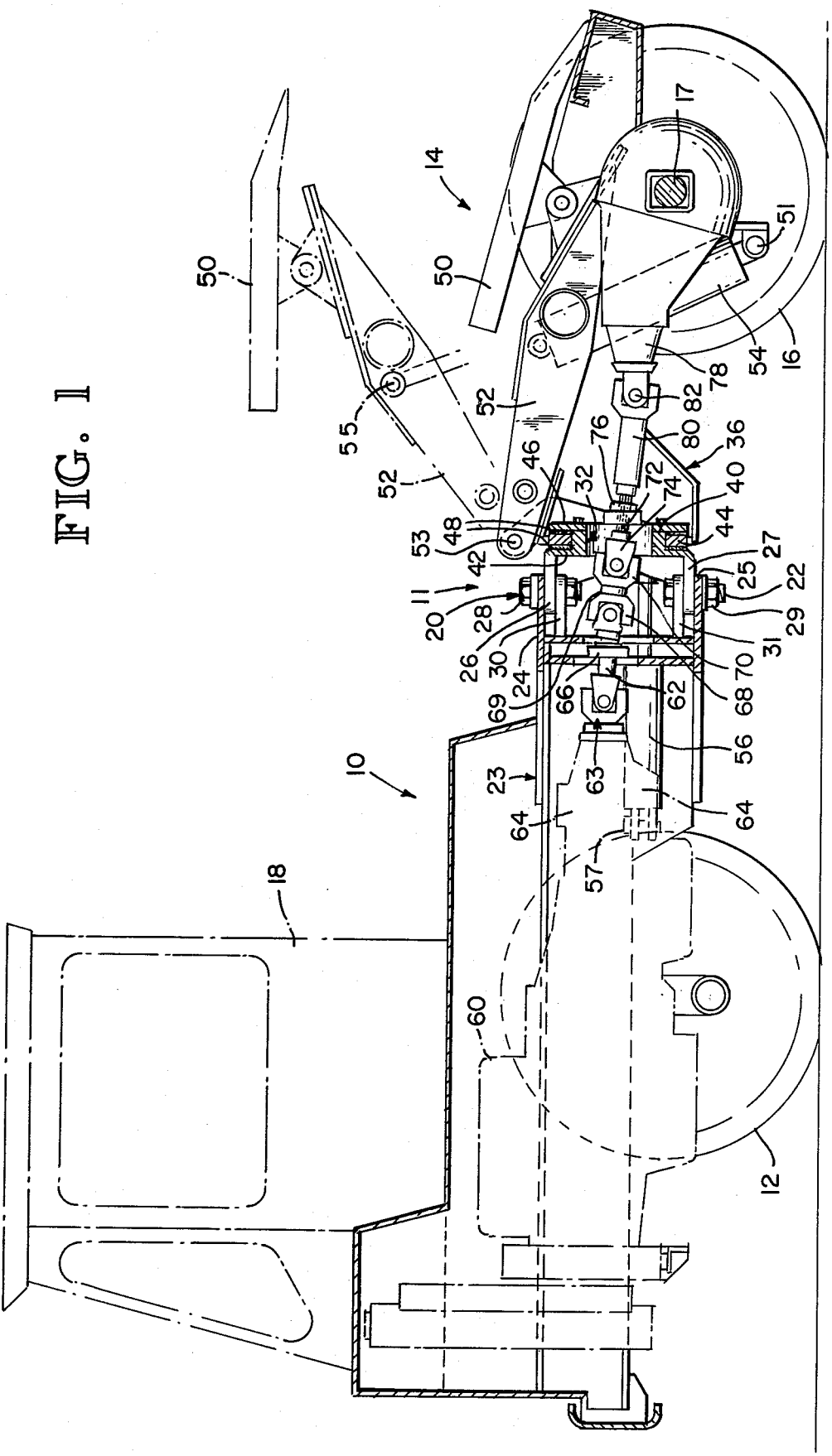
FIG. 1 is a side elevational view of a terminal tractor embodying the present invention and illustrating the fifth wheel plate in elevated and lowered position.

Referring to FIG. 1, the terminal tractor of the present invention is an articulated vehicle and includes a front section 10 supported by a pair of wheels 12 on a front axle 13, an intermediate section 11, and a rear section 14 supported by a pair of dual wheels 16 on a rear axle 17. The front section 10 includes an enclosed cab 18 in which the operator sits to operate the tractor with conventional engine and articulated vehicle steering controls (not shown), and is connected to the intermediate section 11 through a pair of vertically spaced articulation joints 20,22 which allow the sections 10,11 to pivot with respect to each other about a vertical axis. The articulation joints 20,22 are formed by bolts 28,29 in aligned bores in rearwardly directed V-shaped top and bottom frame plates 24,25 on the frame 23 of the front section 10, in fork ears 30,31 on the front frame 23 opposite the frame plates 24,25 and in top and bottom forward ear extensions 26,27 of the frame 32 of the intermediate section 11 which respectively project between top plate 24 and ear 30 and between bottom plate 25 and ear 31. The forward portion of the intermediate frame 32 is best viewed in FIG. 11 in which it is seen that there are a pair of side webs 33,34 extending forwardly from a front frame ring 42 and vertically between the ear extensions 26,27.

The rear section 14 is connected to the intermediate section 11 by an oscillating connection which allows the rear section, including the rear axle 17, to act as a walking beam and rotate with respect to the intermediate section 11 about a longitudinal center axis. With reference also to FIGS. 1 and 11, the oscillating connection includes an annular support ring 40 projecting rearwardly from the front frame ring 42. This support ring 40 carries a bearing ring 44 rigidly secured to the frame 36 of the rear section 14. A keeper plate 46 is bolted to the back of the support ring 40 to prevent axial movement of the bearing ring 44 with respect to the support ring 40 and annular bushings 48 are placed on opposite sides of the bearing ring 44.

Figure 3:
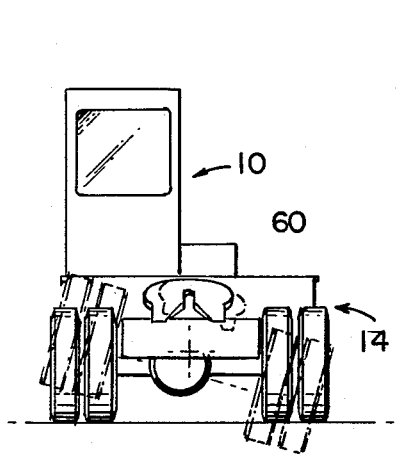
FIG. 3 is a rear elevational view illustrating the manner in which the oscillating connection between the rear sections allows the tractor to traverse irregular road surfaces.
Figure 4:
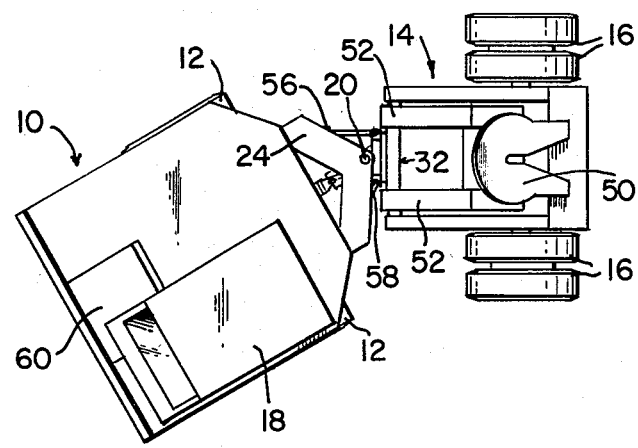
FIG. 4 is a top plan view of the terminal tractor in articulated position.

The oscillating connection between the intermediate and rear sections 11,14 allows the rear section 14 to rotate with respect to the front section 10 along a generally horizontal longitudinal axis as shown in phantom in FIG. 3. This allows the front axle 13 to occupy one plane while the rear axle 17 occupies a different plane. Consequently all of the tractor wheels are able to maintain road contact under all conditions commonly encountered in terminal operations without need of a spring suspension for the front axle 13 or a suspension system for the rear axle 17 relative to the frame 36 of the rear section 14 and without danger of twisting any of the various frame members. It is preferred to provide stiff rubber shock absorbers for the front axle.

A conventional fifth wheel plate 50 is carried by the ends of a pair of rearwardly extending lift arms 52 which are pivotally connected at 53 to the rear frame 36 at a location above the bearing ring 44 and are crossbraced for unitary movement. The left arms 52 are raised from a lowered downwardly sloping position to the selected elevated position by a pair of single stage hydraulic hoists 54 having their cylinders pivotally connected at 51 to the underside of the rear axle assembly 17 and their rods pivotally connected at 55 to the lift arms.

Figure 2:
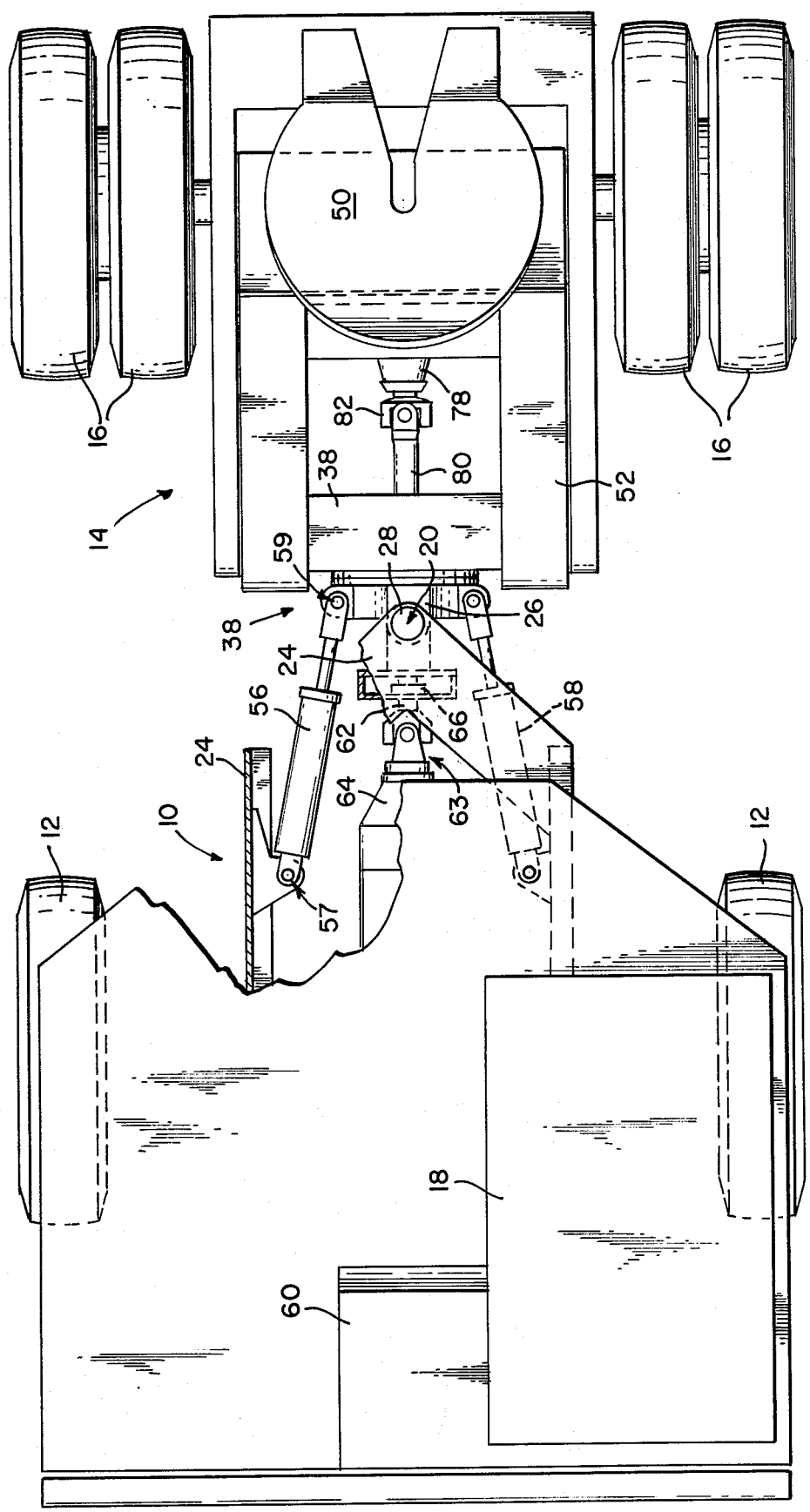
FIG. 2 is a top plan view of the terminal tractor with a portion of the tractor frame cut away for greater clarity.

As best illustrated in FIGS. 2 and 11, the front and rear sections 10,14 are horizontally pivoted relative to one another about the articulation joints 20,22 for steering by a pair of hydraulic rams 56,58 each of which is pivotally connected at its opposite ends to the front frame 24 by a clevis connection 57 and to the center frame section 26 by a clevis connection 59. The rams 56,58 are controlled by conventional hydraulic valving which is actuated through a steering wheel (not shown) in the cab 18. As one of the rams 56 extends in one direction, the other ram 58 retracts in the opposite direction thereby pivoting the front sections 10 with respect to the intermediate and rear sections 11,14 about a vertical axis passing through the articulation joints 20,22.

Power is transmitted from an internal combustion engine 60 on the front section 10 through a drive line which extends through the center of the oscillating connection between the intermediate and rear sections 11,14. The drive line includes a rearwardly sloping front shaft 62 extending from a front universal joint 63 at the output of a transmission 64 coupled to the engine. The shaft 62 extends rearwardly through a bearing block 66 on the front frame 23 and terminates in a conventional universal joint 68. This universal joint is rigidly secured at 69 intermediate the articulation joints 20,22 to a third universal joint 70 which in turn slidably receives a splined rear shaft 72 extending through a splined bore in the hub of its aft yoke 74. With this arrangement the rotational position of the front shaft 62 is fixed with respect to the rear shaft 72, but the splines in the shaft 72 and hub of yoke 74 allow axial movement of the shaft 72 with respect to the yoke 74 to compensate for variations in drive line length as the frame sections articulate about the articulation joints 20,22.

The rear shaft 72 extends rearwardly through a bearing block 76 mounted on the rear frame section 36 and is connected to a differential 78 via a drive tube 80 and universal joint 82. The universal joints 68,70 and spline connection between the rear shaft 72 and yoke 74 allows for the variation in the position of the drive line as the sections 10,14 pivot with respect to each other about a vertical axis passing through the articulation joints 20,22 and as the sections 10,14 rotate with respect to each other about the oscillating connection between the intermediate and rear sections 11,14. Since the drive line passes directly between the articulation joints 20,22 and directly through the center of rotation of the oscillating connection, the variations in drive line length are minimized during articulation and rotation of the sections 10,14 with respect to each other. It is preferred to have the axles 13,17 equally spaced from the articulation axis of the articulation joints 20,22 so that the front and rear wheels 12,16 will track in the same turning circle.

With the described arrangement an unusually compact vehicle with a short wheel base and very small turning circle is achieved. The fifth wheel plate 50 has a particularly low lowered position which may be somewhat forward with respect to the rear axle 17 for good weight distribution of the trailer load. At the same time the location of the pivot 53 of the lift arms 52 and the locations of the pivots 53,55 of the hoists 54 allow the fifth wheel plate 50 to be raised through a range meeting all terminal tractor operating requirements without at the same time unduly moving the fifth wheel plate forwardly of the tractor as the plate is elevated. For many operations the lift arms need not be swung upwardly beyond an upward slope in excess of the downward slope at the fully lowered position shown in full lines in FIG. 1, in which instances the fore and aft movement of the fifth wheel plate is negligible while being raised and lowered. The described arrangement also permits single stage hoists 54 to be used, thereby reducing hoist maintenance.

The standard semi-trailer is eight feet wide and has its king pin mounted beneath a cross-beam commonly located three feet behind the forward end of the trailer. In such a case the front corners of the trailer are five feet from the king pin, and hence there must be in excess of five feet of clearance forwardly of the center of the fifth wheel plate of the tractor when in raised trailer hauling position to allow for turning movement of the trailer relative to the tractor. Additional clearance is needed in front of the fifth wheel plate 50 because the distance between the trailer and the cab shortens when the tractor articulates for steering when the fifth wheel plate is elevated to its trailer hauling position, and also when the trailer tilts forwardly relative to the tractor as when one is on an upwardly sloped ramp and the other is level. Furthermore, for proper load distribution of a trailer on the tractor, the center of the fifth wheel plate 50 should not be rearward of the axis of the rear axle 17 and preferably is a few inches in front of this axis at 11 times. Hence, in order to keep the wheel base of the tractor small (about 8½ feet) and allow adequate clearance for the front portion of the trailer, the tractor of the presend invention has a continuous unobstructed zone extending from the fifth wheel to the rear of the forwardly facing driver'cab 18 which can be occupied by the forward end portion of a semi-trailer coupled to the tractor.

Figure 5:
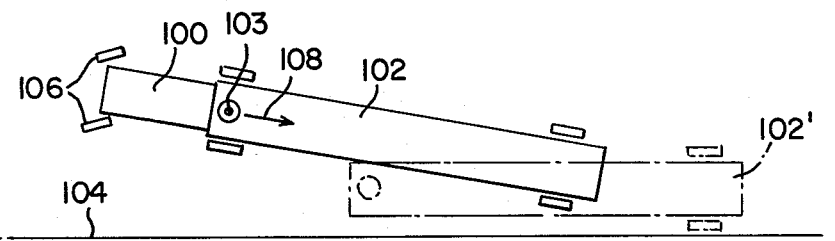
FIG. 5 is a schematic of a conventional tractor and trailer combination illustrating the manner in which the trailer is placed against a wall or other barrier.
Figure 6:
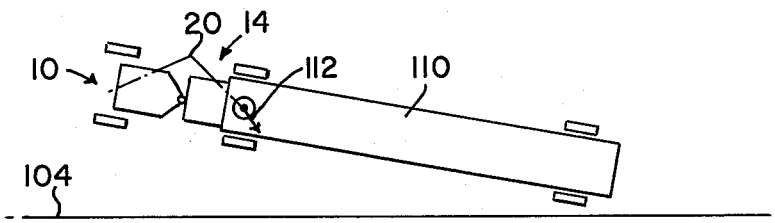
FIGS. 6 and 7 are schematics illustrating the manner in which the tractor of this invention is capable of placing a trailer against a wall or barrier with relatively little longitudinal movement of the tractor.
Figure 7:
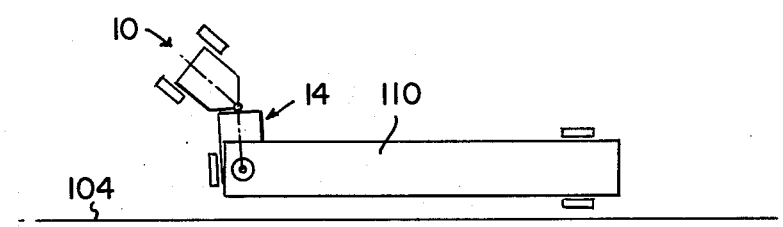

The maneuverability of the tractor of the present invention with a trailer as compared to a conventional terminal tractor is illustrated in FIGS. 5–7. In FIG. 5 a conventional tractor 100 is illustrated placing a semi-trailer 102 against a barrier 104 or other trailer. To accomplish this maneuver the wheels 106 of the tractor are slewed to the left and the tractor is then driven rearwardly as indicated hy arrow 108 to jackknife the tractor relative to the trailer at the fifth wheel 103 as they move rearwardly so that the forward end of the trailer will swing toward the barrier as its rear end moves rearwardly. Even when this maneuver is perfectly performed it is necessary to move the trailer rearwardly a good part of its length in order to place it along the barrier 104.

The tractor of the present invention coupled to a semi-trailer 110 like 102 is shown in FIG. 6 in the same position as the initial position of the conventional tractor and trailer in FIG. 5. To maneuver the trailer 110 against the barrier 104, first the tractor is articulated with the front section 10 angled with respect to the rear section 14 about the articulation joint 20 to the articulated position indicated in phantom in FIG. 6. It will be noted that the trailer 110 has remained stationary during this articulation of the tractor. The articulated tractor is then driven rearwardly. As the rearward driving of the tractor commences the initial movement of the forward end of the trailer 110 is in the direction of the arrow 112 of FIG. 6, and as the forward end of the trailer approaches the barrier its direction of travel is nearly at a right angle to the barrier. By the described procedure the trailer 110 is parked against the barrier 104 with very little rearward movement of the trailer 110 having resulted as can be seen by comparing FIGS. 6 and 7. It is thus seen that the articulation joint between the tractor sections 10,11 together with the fifth wheel connection between the tractor and trailer provides far more maneuverability than provided by the conventional tractor. In this regard, the only way that the trailer 102 can be moved against the barrier without being moved further aft than the trailer 110 in FIG. 7, is to uncouple the tractor 100, move it so that its longitudinal axis is about in the position of arrow 112 in FIG. 6, reconnect it to the trailer and then drive it rearwardly with its front wheels slewed to the left. Not only is this procedure time consuming and burdensome, but it requires considerably more maneuvering room to the right of the barrier.

Another application of the tractor of this invention is illustrated in FIGS. 8–10. As has been previously indicated, a commonly used variety of container trailer is a "roll" trailer 120 which has a set of rear wheels 122 and a wide forward support stand 124. A forwardly open receptacle 126 formed in the center of the stand 124 is adapted to receive a gooseneck connector 128 which is pivotally secured to the fifth wheel plate of the tractor by a conventional kingping. As explained in greater detail in U.S. Pat. No. 3,874,703 the roll trailer 120 is moved about by inserting the rearwardly extending arm 130 of the gooseneck 128 into the receptacle 126 where it is retained by a latching mechanism, and then the fifth wheel of the tractor is elevated thereby raising the stand 124 above the road surface. The roll trailer 120 is then moved to a new position where the stand 124 is again lowered to the road surface and the gooseneck 128 is unlatched and moved forwardly with the tractor free of the stand. One problem with this structure is the difficulty of inserting the arm 130 in the receptacle 126 by backing a conventional tractor since it is difficult to precisely control the lateral position of the outer end of the arm 130. With the articulated tractor described herein, however, articulation of the forward section 10 with respect to the rear section 14 produces a wagging of the arm 130 as illustrated in FIG. 10 thus making it much easier to bring the arm 130 into registry with the mouth of the retaining box 126. In operation it has been found that about four cycles of forward and rearward movement of a conventional terminal tractor are frequently necessary to position the arm 130 in the receptacle 126, whereas with the articulating tractor of this invention the operator is normally able to perform this function during a single backing of the tractor.

The ability of the tractor operator to move the fifth wheel plate laterally back and forth as well as up and down without need of longitudinal movement of the tractor, is also of great value in backing the tractor into registry with auxiliary trailer stands of the type previously described, and namely, of the general type disclosed in U.S. Pat. No. 3,603,544.

Since the oscillation arrangement in the tractor between the intermediate and rear sections 11,14 eliminates the need for any suspension system between the rear axle 17 and the frame 36 of the rear section 14, the fifth wheel plate 50 can have a bottom limit of travel which is lower than otherwise known on a compact tractor having a lift mechanism for the fifth wheel plate and having a fifth wheel plate location over or slightly forward of the rear axle. This is of significant help in coupling to a trailer whose kingpin is much lower than normal due to the landing gear not being fully extended or having its lower end sunk into the ground as previously described.

From FIG. 1 it can be seen that the engine 60 is located forwardly of the front axle 13. This arrangement not only contributes to the tractor having an unusually short wheel base between axles but places the weight of the engine in the most advantageous location to serve as a counterweight to resist the tendency in a terminal tractor for the front end to be lifted from ground contact under heavy torque conditions, particularly when the fifth wheel plate 50 is occupying the upper portion of its lift range. Hence, the tractor of this invention does not require the use of front auxiliary counterweights for those situations in which they are needed on conventional terminal tractors.

From the foregoing detailed description of the invention it can be seen that the invention meets all of the objectives hereinbefore set forth, and hence is a major advance over the prior terminal tractors.

The embodiments of the invention in which a particular property or privilege is claimed are defined as follows:

1. A tractor for use with a trailer having a fifth wheel component comprising:
front and rear chassis sections having front and rear axles, respectively, and pivotally connected at an articulation joint for steering the tractor by articulation of said chassis sections relative to one another at an articulation axis, there being front and rear wheels at the ends of the front and rear axles, respectively,
engine means on the front chassis section,
drive means connecting the engine means to one of said axles,
a forwardly facing driver's station located on the front chassis section in forwardly spaced relation from said articulation joint,
steering means for controlling said articulation;
fifth wheel means on said rear chassis section for detachably receiving the fifth wheel component of the trailer at a coupling location in the fifth wheel means and permitting turning of the trailer with little longitudinal movement thereof responsive to articulation of the tractor, and
lift means on the rear chassis section supporting the fifth wheel means in laterally centered relation and against lateral movement or horizontal swinging movement relative to the rear chassis section during articulation of said chassis sections and supporting the fifth wheel means for movement in a travel path between a lowered position whereat said coupling location is above and adjacent the level of the top extremity of the rear wheels and a raised position, said travel path being located such that said coupling location remains within the confines of laterally extending vertical planes passing through the front and rear extremities of the rear wheels as the fifth wheel means moves between said lowered and raised positions,
said tractor having a continuous horizontally unobstructed zone overlying the entire rear chassis section, lift means and articulation joint, and overlying a rear portion of the front chassis section behind the driver's station for the entire width of the front chassis section for receiving the forward portion of a trailer coupled to the tractor.

2. The tractor of claim 1, wherein the front and rear sections of said tractor are joined through oscillating connector means for allowing rotation of said sections with respect to each other generally along a longitudinal, generally horizontal oscillation axis thereby allowing all of the wheels of the tractor to maintain road contact while traveling on irregular road surfaces or while the tractor is turning at the end of a ramp.

3. The tractor of claim 2, in which said rear axle is driven and said drive means comprises drive line means interconnecting said engine means and rear axle, said drive line means intersecting said articulation axis when said front and rear chassis sections are longitudinally alined, and passing freely through said oscillating connector means along said oscillation axis.

4. The tractor of claim 2, in which said lift means includes lift arm means pivotally connected at its forward end to said rear chassis section above said oscillating connector means and carrying said fifth wheel means at its rear end, said lift arm means sloping downwardly from its forward end toward its rear end when the fifth wheel means is at its lowermost position.

5. The tractor of claim 2, in which said rear chassis section includes a frame connected to said oscillating connector means, and a differential and said rear axle rigidly secured together to said frame to oscillate therewith.

6. The tractor of claim 2 in which said oscillating connector comprises:
an intermediate section having its forward ends pivotally secured to the rear end of said front chassis section with said steering means being adapted to pivot said front and intermediate sections relative to one another to thereby steer said front and rear chassis sections relative to one another,
said intermediate section having a rear frame ring presenting a rearwardly facing annular bearing and having an annular support ring of reduced diameter projecting rearwardly from said intermediate section at the center of said annular bearing,
a bearing ring mounted on the forward end of said rear chassis section and sleeved on said support ring for turning thereon, said bearing ring opposing said annular bearing to thereby resist twisting movement of the rear chassis section relative to said intermediate section, and
keeper means for holding said bearing ring on said support ring and thereby coupling said intermediate and rear sections against relative endwise movement.

7. The tractor of claim 2 in which said engine means is mounted on said front section forwardly of said front axle and said rear axle is driven, and extendible articulated drive line means from said engine means to said rear axle passing through said articulation axis when said front and rear sections are alined and passing along said oscillation axis.

8. The tractor of claim 1 in which said axles are equidistant from said articulation axis.

9. The tractor of claim 1 in which a forwardly facing cab containing said driver's station is mounted at the front of said front chassis section, said unobstructed zone continuing forwardly to the rear of the cab.

10. The tractor of claim 1 in which a forwardly facing cab containing said driver's station is mounted on said front chassis section directly above said engine means, and in which most of said cab and engine means is located forwardly of said front axle.

* * * * *